US010851852B2

(12) United States Patent
Light et al.

(10) Patent No.: US 10,851,852 B2
(45) Date of Patent: Dec. 1, 2020

(54) VISCOUS FLUID SHEAR DEVICE HAVING WIPER FIXEDLY COUPLED TO HOUSING ASSEMBLY

(71) Applicant: BorgWarner Inc., Auburn Hills, MI (US)

(72) Inventors: Gerard M. Light, Marshall, MI (US); Jonathan B. Stagg, Bellevue, MI (US)

(73) Assignee: BorgWarner Inc., Auburn Hills, MI (US)

( * ) Notice: Subject to any disclaimer, the term of this patent is extended or adjusted under 35 U.S.C. 154(b) by 111 days.

(21) Appl. No.: 16/179,056

(22) Filed: Nov. 2, 2018

(65) Prior Publication Data

US 2019/0136916 A1    May 9, 2019

Related U.S. Application Data

(60) Provisional application No. 62/581,888, filed on Nov. 6, 2017.

(51) Int. Cl.
*F16D 35/02* (2006.01)

(52) U.S. Cl.
CPC ......... *F16D 35/023* (2013.01); *F16D 35/022* (2013.01)

(58) Field of Classification Search
CPC ........................................... F16D 35/021–025
See application file for complete search history.

(56) References Cited

U.S. PATENT DOCUMENTS

| | | | |
|---|---|---|---|
| 4,355,709 A | 10/1982 | Light | |
| 4,457,417 A | 7/1984 | Light | |
| 4,627,523 A | 12/1986 | Light | |
| 4,633,988 A | 1/1987 | Light | |
| 4,633,994 A | 1/1987 | Light | |
| 4,678,070 A | 7/1987 | Light | |
| 4,683,999 A | 8/1987 | Light et al. | |
| 4,741,421 A * | 5/1988 | Johnston | F16D 35/023 192/58.682 |
| 4,949,825 A | 8/1990 | Light | |
| 4,958,709 A * | 9/1990 | Kennedy | F16D 35/023 192/58.682 |
| 5,060,774 A * | 10/1991 | Takikawa | F16D 35/022 192/58.681 |
| 5,117,898 A | 6/1992 | Light et al. | |
| 5,377,798 A * | 1/1995 | Hudson | F16D 35/023 192/58.4 |
| 5,893,442 A | 4/1999 | Light | |
| 6,206,639 B1 | 3/2001 | Light et al. | |
| 6,358,010 B2 | 3/2002 | Light et al. | |
| 6,530,748 B2 | 3/2003 | Light et al. | |
| 6,644,933 B2 | 11/2003 | Light et al. | |
| 7,621,386 B2 | 11/2009 | Light | |
| 7,650,974 B2 | 1/2010 | Light et al. | |
| 7,963,380 B2 | 6/2011 | Light et al. | |
| 9,470,278 B1 | 10/2016 | Stagg et al. | |
| 2004/0020700 A1 | 2/2004 | Watson et al. | |

(Continued)

*Primary Examiner* — Stacey A Fluhart
(74) *Attorney, Agent, or Firm* — Burris Law, PLLC

(57) ABSTRACT

A viscous fluid shear device having a housing, a rotor, which is rotatable in the housing, and a wiper that is coupled to the housing. The housing defines a scavenge conduit and a nozzle. Viscous fluid that clings to the circumference of the rotor during operation of the viscous fluid shear device is driven through the nozzle and directed by the wiper into the scavenge conduit.

24 Claims, 7 Drawing Sheets

(56) References Cited

U.S. PATENT DOCUMENTS

| | | |
|---|---|---|
| 2006/0243553 A1 | 11/2006 | Light et al. |
| 2006/0243817 A1 | 11/2006 | Light et al. |
| 2010/0059325 A1 | 3/2010 | Boyer |
| 2010/0122885 A1* | 5/2010 | Light .................... F16D 35/024 192/58.7 |
| 2011/0168512 A1 | 7/2011 | May |
| 2013/0134008 A1 | 5/2013 | Boyer |
| 2017/0130783 A1* | 5/2017 | Stagg .................... F16D 35/021 |

* cited by examiner

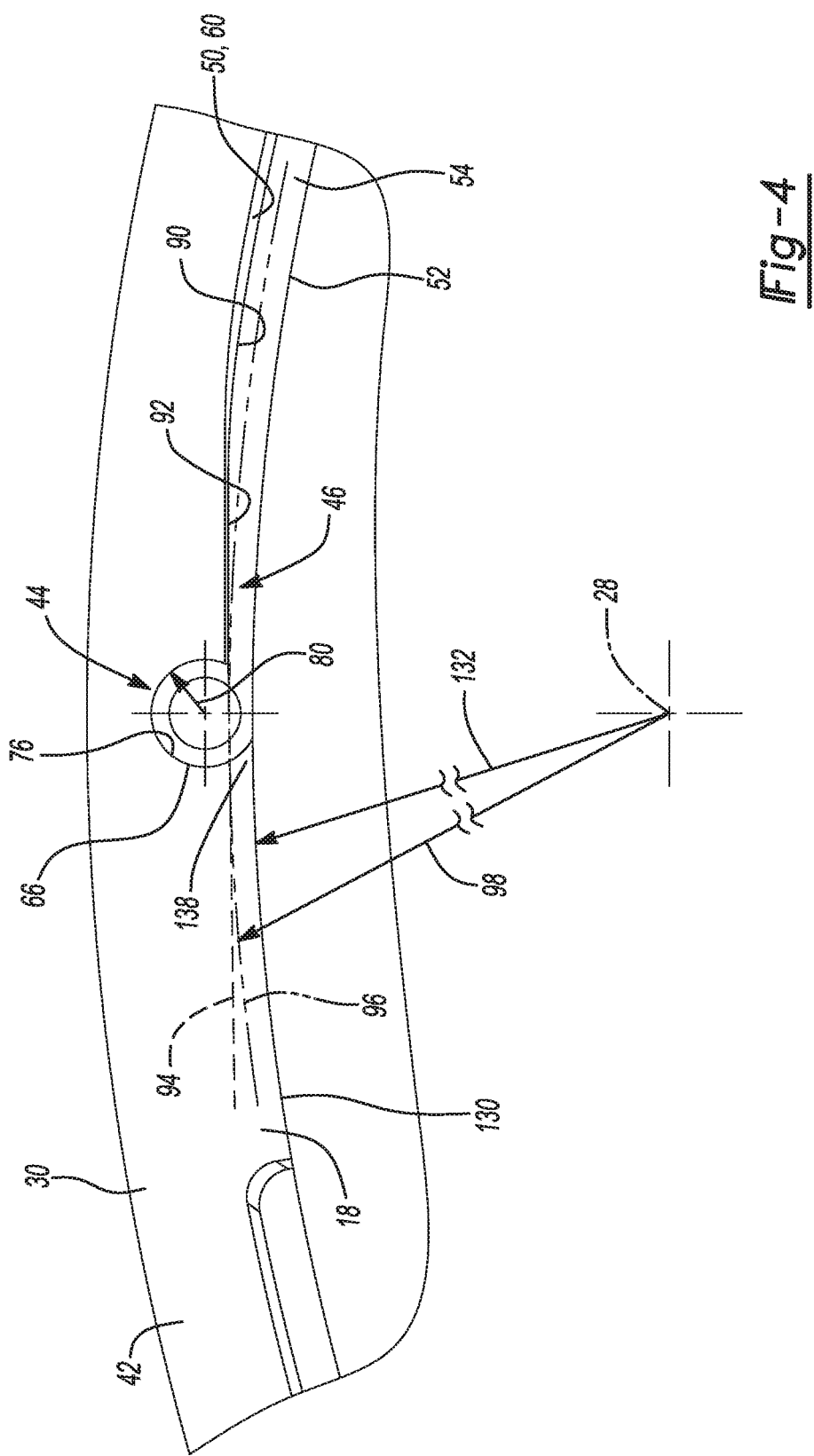

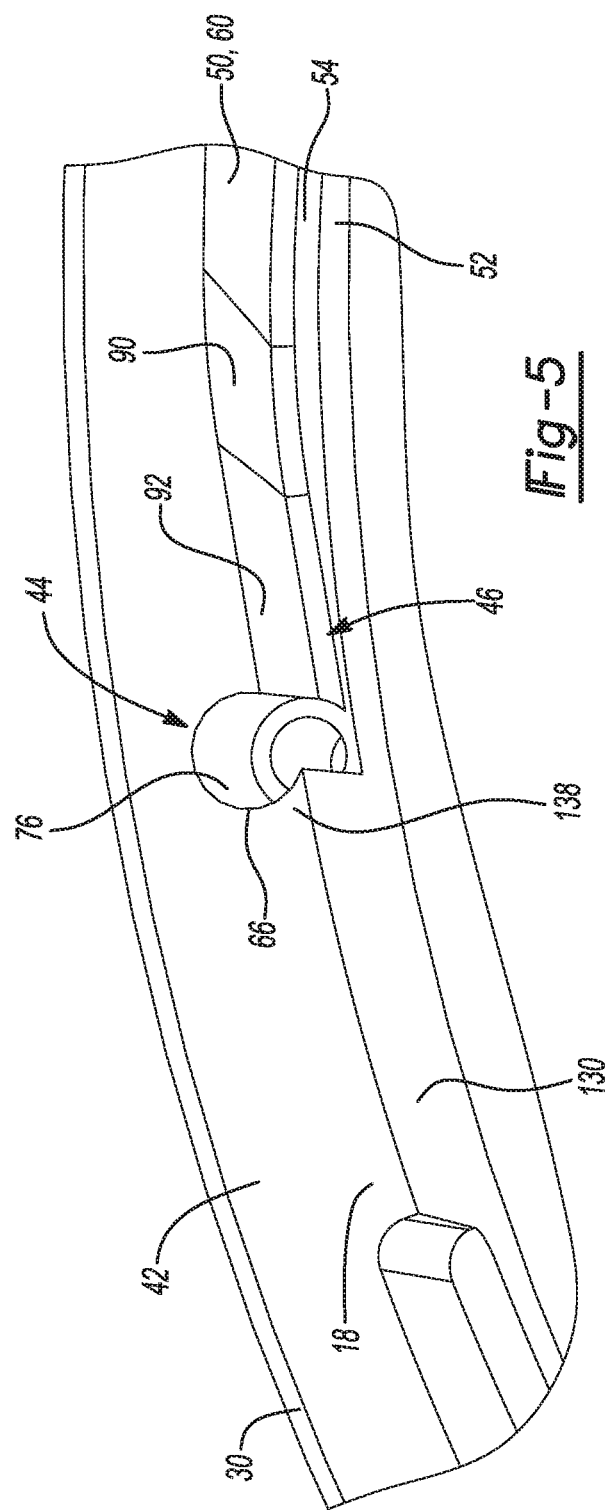
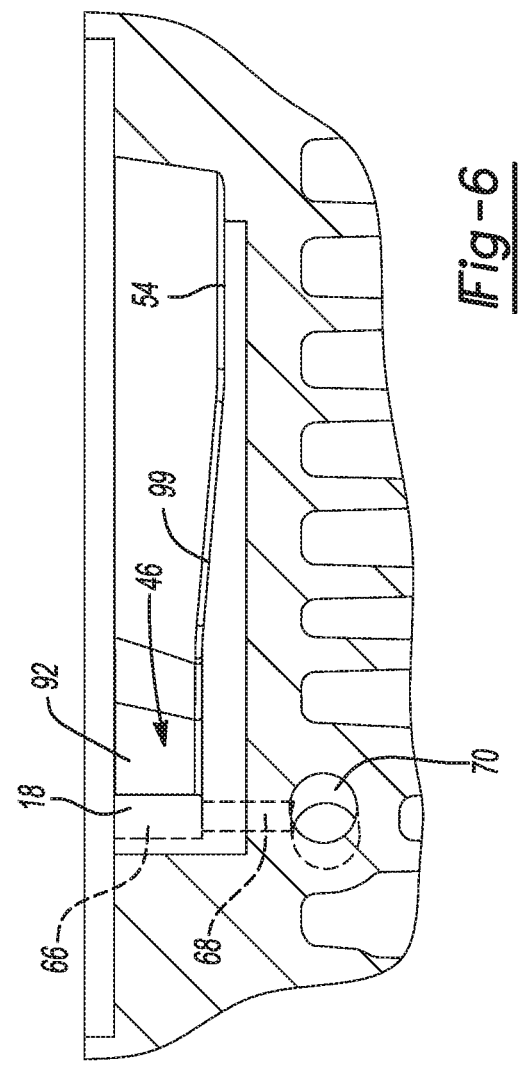

VISCOUS FLUID SHEAR DEVICE HAVING WIPER FIXEDLY COUPLED TO HOUSING ASSEMBLY

CROSS-REFERENCE TO RELATED APPLICATIONS

This application claims the benefit of U.S. Provisional Patent Application No. 62/581,888 filed Nov. 6, 2017, the disclosure of which is incorporated by reference as if fully set forth in detail herein.

FIELD

The present disclosure relates to a viscous fluid shear device having a wiper that is fixedly coupled to a housing assembly.

BACKGROUND

Viscous fluid shear devices having a wiper that is fixedly coupled to a housing assembly are known in the art and include a first configuration in which the wiper is unitarily and integrally formed with a component of the housing assembly, and a second configuration in which the wiper is assembled to the housing assembly. The housing assembly of both of these configurations defines a cavity into which a rotor is rotatably received. A viscous fluid in the cavity is employed to transmit rotary power between the rotor and the housing assembly. The viscous fluid migrates in a radially outward direction during operation of the viscous fluid shear device. The wiper cooperates with the rotor to drive the viscous fluid that has migrated radially outwardly into a scavenge passage where the viscous fluid can be returned to a reservoir that is employed to supply the viscous fluid to the cavity. While the prior configurations of viscous fluid shear devices having a wiper that is fixedly coupled to a housing assembly are generally satisfactory for their intended, both configurations are known to have drawbacks.

Regarding the known configurations in which the wiper is integrally and unitarily formed with the housing assembly, we note that significant clearances are typically designed between the rotor and both the housing assembly and the wiper to accommodate the relatively higher thermal expansion that is experienced by the rotor (the rotor cannot reject heat as quickly as the housing assembly and consequently, the temperature of the rotor will typically be higher than that of the housing assembly during steady-state operation of the viscous fluid shear device). This relatively high magnitude of clearance with conventional practices for the configuration of the wiper and the inlet to the scavenge passage cooperate to reduce the overall efficiency (i.e., scavenging efficiency) with which the viscous fluid is input to the scavenge passage and returned to the reservoir. In some viscous fluid shear devices, this reduced scavenging efficiency can result in a failure to sufficiently evacuate the viscous fluid from the cavity so that a higher magnitude of shear forces act between the rotor and the housing assembly than are desired. In a configuration in which the housing assembly is the output of the viscous fluid shear device, this condition would cause the housing assembly to rotate at a higher than desired speed for a given (input) speed of the rotor.

Regarding the known configurations in which the wiper is assembled to the housing assembly, we note that the wiper is commonly formed of a plastic material and is sized in a way that can permit the wiper to contact the rotor if the rotor expands relative to the housing assembly due to thermal expansion by a predetermined amount. The plastic wiper can be a relatively expensive component (compared to a wiper that is integrally and unitarily formed with the housing assembly) and moreover, can be relatively expensive to insert into the housing assembly. Furthermore, contact between the wiper and the rotor can cause the wiper to wear, which can degrade the scavenging efficiency of the viscous fluid shear device as well as undesirably contaminate the viscous fluid, which can degrade the performance and/or longevity of the viscous fluid shear device.

SUMMARY

This section provides a general summary of the disclosure, and is not a comprehensive disclosure of its full scope or all of its features.

In one form, the present teachings provide a viscous fluid shear device that includes a housing assembly, a rotor and a reservoir. The housing assembly defines a working chamber having a plurality of first ribs, which are disposed concentrically about a central axis. The housing assembly includes first and second housing members that are fixedly coupled to one another. The first housing member has a circumferentially extending wall and a viscous fluid return system. The circumferentially extending wall defines a working chamber channel having a radially inner surface. The viscous fluid return system has a wiper, a scavenge conduit and a nozzle. The wiper is unitarily and integrally formed with the circumferentially extending wall and projects radially inwardly of the radially inner surface of the working chamber channel. The scavenge conduit has a scavenge inlet aperture, a first conduit portion and a second conduit portion. The scavenge inlet aperture is formed into the circumferentially extending wall and intersects the wiper such that a first portion of a surface of the scavenge inlet aperture forms a leading end of the wiper. The scavenge inlet aperture is formed along a first longitudinal axis and has a first cross-sectional area taken perpendicular to the first longitudinal axis. The first conduit portion is formed in the circumferentially extending wall and intersects the scavenge inlet aperture. The first conduit portion is formed along a second longitudinal axis. The second conduit portion intersects the first conduit portion and extends radially inwardly therefrom. The nozzle extends circumferentially between the working chamber channel and scavenge inlet aperture. The nozzle is configured to discharge a viscous fluid directly into the scavenge inlet aperture. The rotor is received in the housing assembly and is rotatable about the central axis relative to the housing assembly in a first predetermined rotational direction. The rotor has a disk portion with a plurality of second ribs that are disposed concentrically about the central axis and juxtaposed with the first ribs. The reservoir is disposed in the housing assembly and is in fluid communication with the scavenge conduit. A radially inner surface of the working chamber channel is disposed from a circumferentially extending surface of the rotor by a first distance. At least one point on a radially inner surface of the wiper is disposed from the circumferentially extending surface of the rotor by a second distance that is smaller than the first distance. A point at which the nozzle intersects the scavenge input aperture is disposed a third distance from the circumferentially extending surface of the rotor. The third distance is less than the first distance and greater than the second distance.

In a further form, the nozzle comprises a radially outer surface, and at least a portion of the radially outer surface of the nozzle has a flat, planar shape. Optionally, a line is at least partially disposed in the portion of the radially outer surface of the nozzle having the flat, planar shape, wherein the line is spaced from the central axis by a predetermined distance, and wherein the line is sloped such that it is within +10 degrees to −5 degrees of being tangent to a circle centered at the central axis, the circle having a radius equal to the predetermined distance.

In a further form, the radially inner surface of the working chamber channel is formed with draft such that the radially inner surface of the working chamber channel is shaped as a portion of a surface of a frustum. Optionally, a magnitude of the draft on the radially inner surface of the working chamber channel is less than or equal to 5 degrees. Optionally, the magnitude of the draft on the radially inner surface of the working chamber channel is less than or equal to 3 degrees. Optionally, the nozzle comprises a radially outer surface, and wherein at least a portion of the radially outer surface of the nozzle is formed with draft. Optionally, a magnitude of the draft on the radially outer surface of the nozzle is less than a magnitude of the draft on the radially inner surface of the working chamber channel. Optionally, the magnitude of the draft on the radially outer surface of the nozzle is less than or equal to 1.5 degrees.

In a further form, the surface of the scavenge inlet aperture is defined by a radius that extends perpendicular from the first longitudinal axis of the scavenge inlet aperture. Optionally, the radially inner surface of the wiper is defined by a radius that extends from the central axis, wherein the radius of the radially inner surface of the wiper is intersected twice by the radius of the surface of the scavenge inlet aperture. Optionally, the radius is less than or equal to 1.5 mm.

In a further form, the first and second longitudinal axes are coincident.

In a further form, the circumferentially extending surface of the rotor extends laterally into the first housing member past the scavenge inlet aperture.

In a further form, the working chamber channel terminates at a circumferentially extending shoulder, and wherein the nozzle comprises a first lateral ramp that extends laterally between at least a portion of a span between the circumferentially extending shoulder and the scavenge inlet aperture. Optionally, the first housing member further defines a first rotor bore that is formed in the circumferentially extending wall, the first rotor bore being smaller in diameter than the working chamber channel, the first rotor bore extending laterally into the first housing member, the circumferentially extending surface of the rotor extending laterally beyond the working cavity into the first rotor bore. Optionally, the first rotor bore is larger in diameter than the circumferentially extending surface of the rotor by an amount that is less than or equal to 1.5 mm and greater than or equal to 0.5 mm. Optionally, the amount is less than or equal to 0.8 mm. Optionally, the second housing member defines a second rotor bore, and wherein the circumferentially extending surface of the rotor extends laterally into the second rotor bore. Optionally, the second housing member defines a working chamber groove that is formed into an abutment surface of the second housing member that faces the first housing member, the working chamber groove having a root surface, and wherein the nozzle comprises a second lateral ramp that extends laterally between at least a portion of a span between the root surface and the scavenge input aperture. Optionally, the abutment surface closes an end of the scavenge input aperture that is opposite the first conduit portion. Optionally, the second rotor bore has a diameter that is equal to a diameter of the first rotor bore.

In a further form, at least a portion of the first conduit portion has a second cross-sectional area taken perpendicular to the second longitudinal axis that is smaller than the first cross-sectional area.

In another form, the present teachings provide a viscous fluid shear device that includes a housing assembly, a wiper and a rotor. The housing assembly defines a working chamber having a plurality of first ribs, which are disposed concentrically about a central axis. The housing assembly includes first and second housing members that are fixedly coupled to one another. The first housing member has a circumferentially extending wall and a scavenge conduit. The circumferentially extending wall defines a working chamber channel, a first rotor bore and a circumferentially extending shoulder. The working chamber channel has a radially inner surface and terminates laterally at the circumferentially extending shoulder. The first rotor bore is smaller in diameter than the working chamber channel and extends laterally into the first housing member past the circumferentially extending shoulder. The scavenge conduit has a scavenge inlet aperture, a first conduit portion and a second conduit portion. The scavenge inlet aperture is formed into the circumferentially extending wall along a first longitudinal axis and has a first cross-sectional area taken perpendicular to the first longitudinal axis. The first conduit portion is formed in the circumferentially extending wall and intersects the scavenge inlet aperture. The first conduit portion is formed along a second longitudinal axis. The second conduit portion intersects the first conduit portion and extends radially inwardly therefrom. The second housing member defines a second rotor bore. The wiper is coupled to the first housing member proximate the scavenge inlet aperture. The rotor is received in the housing assembly and is rotatable about the central axis relative to the housing assembly in a first predetermined rotational direction. The rotor has a disk portion with a plurality of second ribs and a circumferentially extending surface. The plurality of second ribs are disposed concentrically about the central axis and juxtaposed with the first ribs. The circumferentially extending surface of the rotor extends in a first later direction laterally beyond the working cavity into the first rotor bore. The circumferentially extending surface of the rotor also extends laterally in a second, opposite lateral direction into the second rotor bore.

In a further form, the wiper is unitarily and integrally formed with the first housing member.

In a further form, at least one of the first and second rotor bores is formed with draft so as to be frustoconical in shape.

In a further form, at least a portion of the first conduit portion has a second cross-sectional area taken perpendicular to the second longitudinal axis that is smaller than the first cross-sectional area.

In a further form, the second rotor bore has a diameter that is equal to the diameter of the first rotor bore.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is an enlarged portion of the cover member of FIG. 3;

FIG. 5 is a perspective view of a portion of the cover member of FIG. 3;

FIG. 6 is a section view of a portion of the cover member;

Corresponding reference numerals indicate corresponding parts throughout the several views of the drawings.

DETAILED DESCRIPTION

Figure 1:
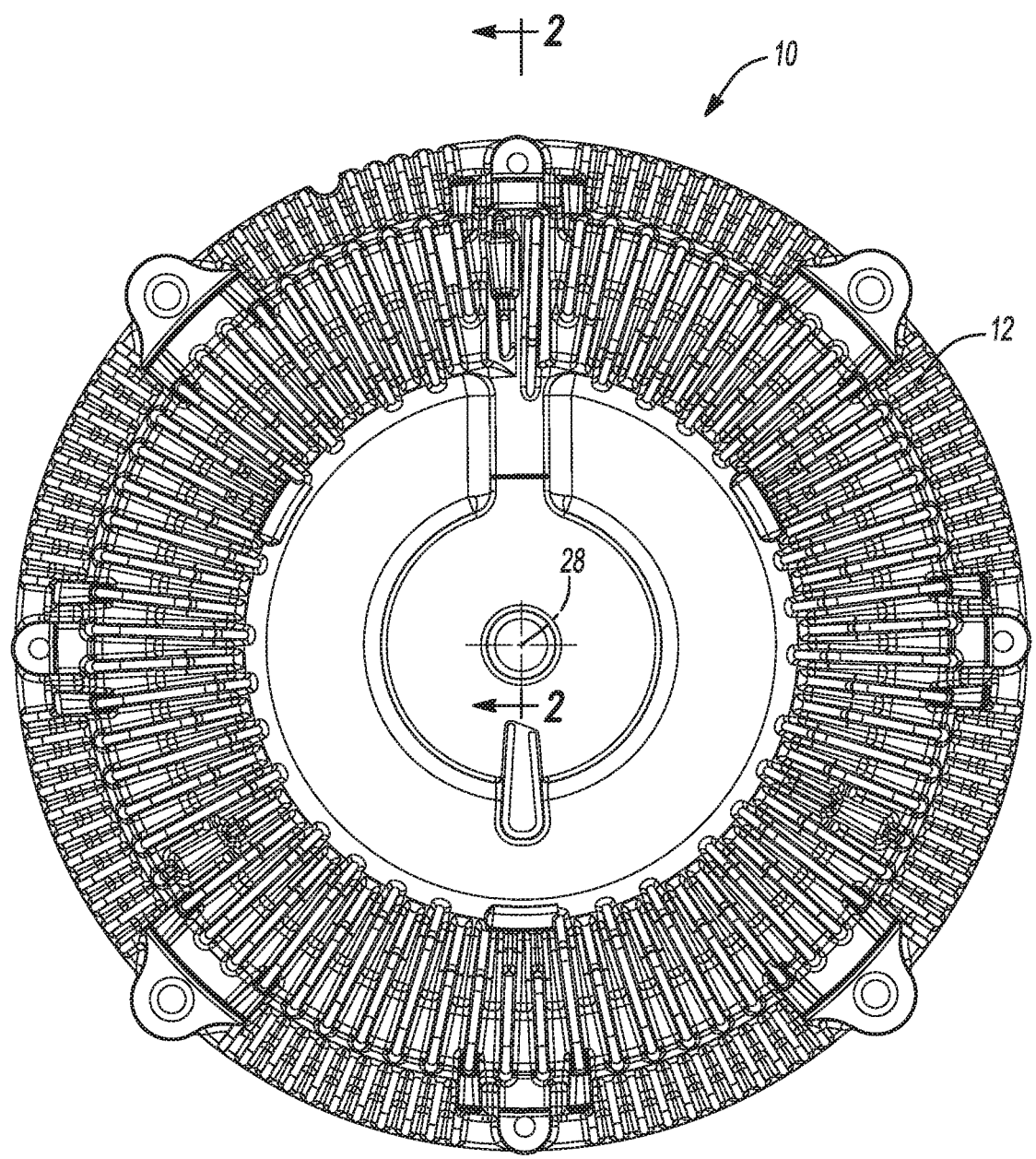
FIG. 1 is a front elevation view of a viscous fluid shear device constructed in accordance with the teachings of the present disclosure.
Figure 2:
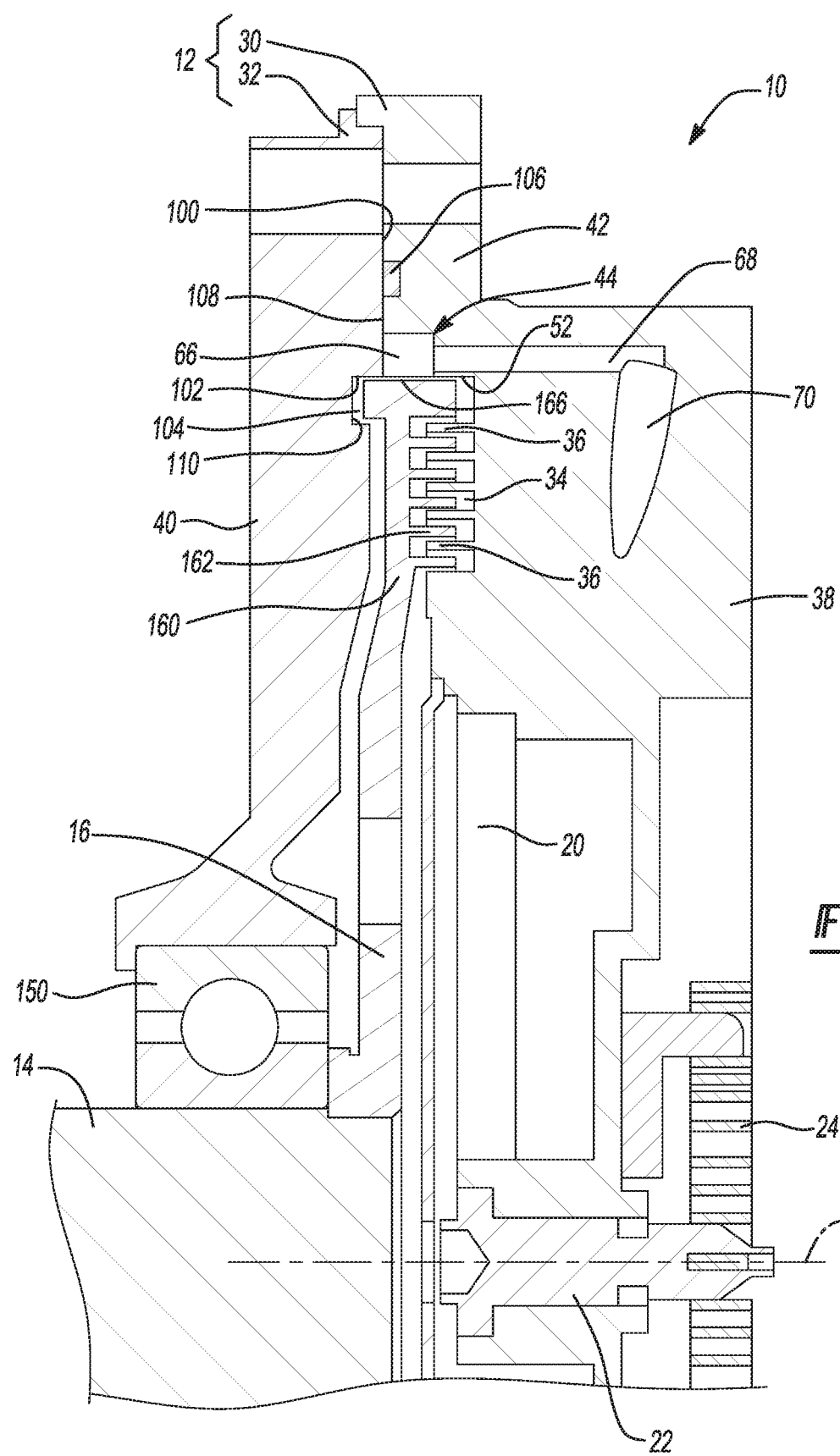
FIG. 2 is a section view taken along the line 2-2 of FIG. 1.
Figure 3:
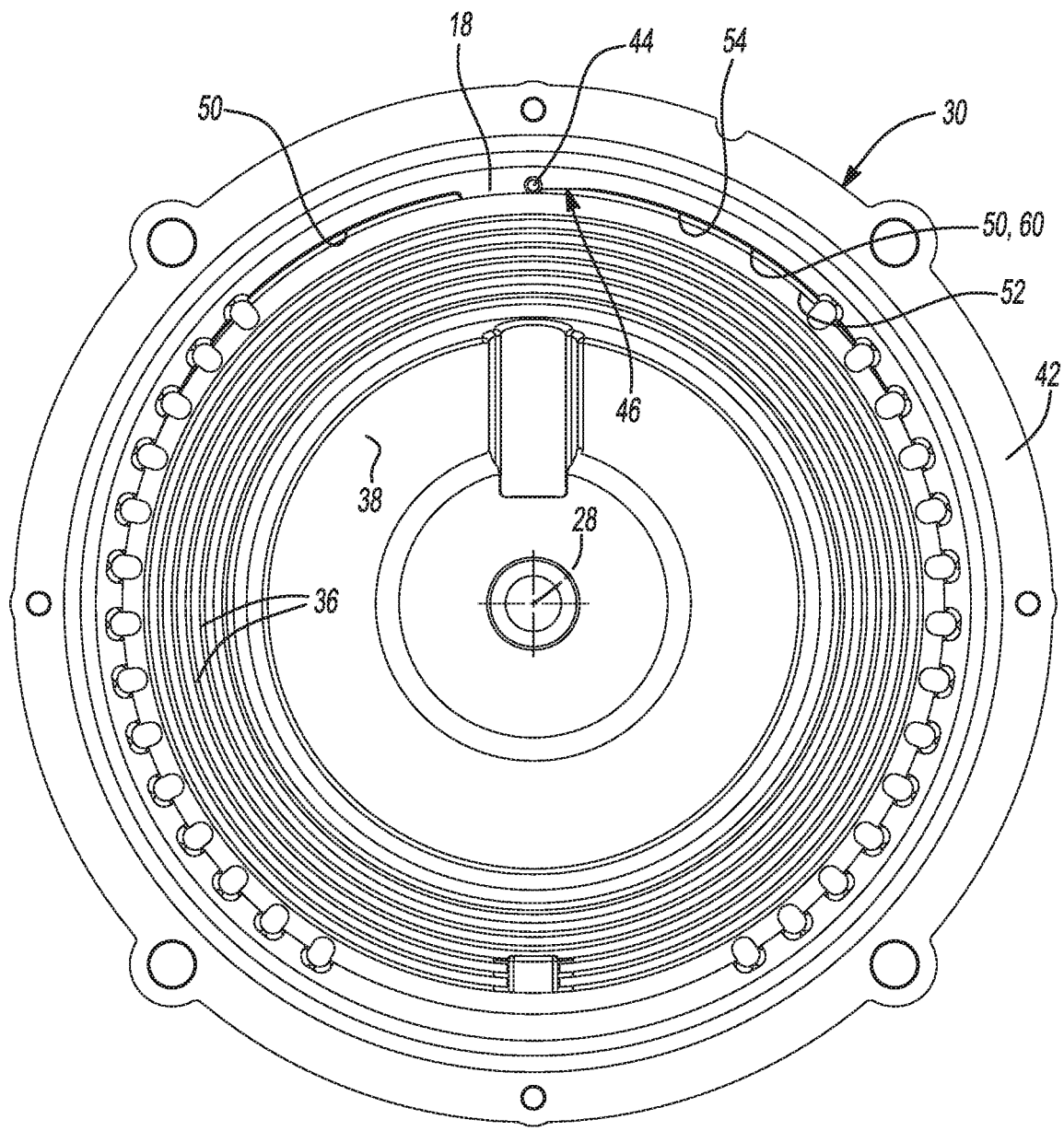
FIG. 3 is a rear elevation view of a portion of the viscous fluid shear device of FIG. 1 illustrating a cover member of a housing assembly.

With reference to FIGS. 1 through 3 of the drawings, an exemplary viscous fluid shear device constructed in accordance with the teachings of the present disclosure is generally indicated by reference numeral 10. The viscous fluid shear device 10 can include a housing assembly 12, a shaft 14, a rotor 16, a wiper 18, a reservoir 20, a control valve 22, and an actuator 24. In the example provided, the viscous fluid shear device 10 is a clutch or coupling, the housing assembly 12, the shaft 14 and the rotor 16 are rotatable about a central axis 28, the shaft 14 is the input member of the viscous fluid shear device 10 and the housing assembly 12 is the output member of the viscous fluid shear device 10. It will be appreciated, however, that the housing assembly 12 could be the input of the viscous fluid shear device 10 and the shaft 14 could be the output of the viscous fluid shear device 10. It will also be appreciated that one of the housing assembly 12 and the shaft 14 can be non-rotatable (relative to the other one of the housing assembly 12 and the shaft 14), as in the case where the viscous fluid shear device 10 is a type of heater.

In FIGS. 2 and 3, the housing assembly 12 can include first and second housing members 30 and 32, respectively, that are fixedly coupled to one another and cooperate to define a working chamber 34 that can have a plurality of first ribs 36 that are disposed concentrically about the central axis 28. In the example provided, the first ribs 36 are disposed solely on a first radially extending wall 38 on the first housing member 30, but it will be appreciated that the first ribs 36 could be formed solely on a second radially extending wall 40 on the second housing member 32 or on both the first and second radially extending walls 38 and 40.

The first housing member 30 can further include a first circumferentially extending wall 42, a scavenge conduit 44 and a nozzle 46. The first circumferentially extending wall 42 can define a working chamber channel 50, a first rotor bore 52, and a circumferentially extending shoulder 54. With additional reference to FIGS. 4 and 5, the working chamber channel 50 can extend about a portion of the circumference of the first housing member 30 and can have a radially inner surface 60. The working chamber channel 50 can terminate laterally (i.e., along the central axis 28) at the circumferentially extending shoulder 54. The first rotor bore 52 can be smaller in diameter than the working chamber channel 50. The first rotor bore 52 can extend laterally (i.e., along the central axis 28) into the first circumferentially extending wall 42 of the first housing member 30 past the circumferentially extending shoulder 54. If the first housing member 30 is formed at least partly via casting, the first rotor bore 52 could be formed with draft so as to be frustoconical in shape.

Figure 7:
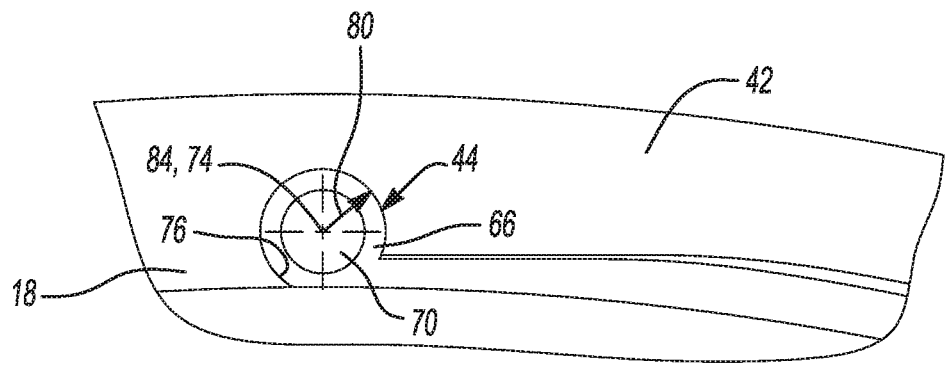
FIG. 7 is an enlarged portion of FIG. 4.

With reference to FIGS. 2 and 7, the scavenge conduit 44 can have a scavenge inlet aperture 66, a first conduit portion 68 and a second conduit portion 70. The scavenge inlet aperture 66 can be formed into the first circumferentially extending wall 42. The scavenge inlet aperture 66 can be formed along a first longitudinal axis 74 and can have a first cross-sectional area that is taken perpendicular to the first longitudinal axis 74. The surface 76 of the scavenge inlet aperture 66 can be shaped in any manner desired, but in the example provided the surface 76 is defined by a radius 80 that can extend perpendicular (i.e., radially) from the first longitudinal axis 74. The radius 80 can be sized in a desired manner, but in the example provided, the radius 80 is less than or equal to 1.5 mm. The first conduit portion 68 can be formed in the first circumferentially extending wall 42 and can intersect the scavenge inlet aperture 66. The first conduit portion 68 can be formed along a second longitudinal axis 84. In the example provided, the first and second longitudinal axes 74 and 84 are coincident, but it will be appreciated that the second longitudinal axis 84 can be oriented relative to the first longitudinal axis 74 in a manner that is different from that which is depicted in the drawings. If desired, the first conduit portion 68 can have a second cross-sectional area taken perpendicular to the second longitudinal axis 84 that is smaller than the first cross-sectional area (of the scavenge inlet aperture 66). The second conduit portion 70 can intersect the first conduit portion 68 and can extend radially inward therefrom.

With reference to FIGS. 4 and 5, the nozzle 46 can extend circumferentially between the working chamber channel 50 and the scavenge inlet aperture 66. The nozzle 46 can be configured to discharge a viscous fluid (passing circumferentially through the nozzle 46) directly into the scavenge inlet aperture 66. The nozzle 46 can have a radially outer surface 90 and optionally, at least a portion 92 of the radially outer surface 90 can be formed to have a flat, planar shape. The portion 92 of the radially outer surface 90 that is formed as a flat, planar shape can include a line 94 that can be sloped such that it is within +10 degrees to −5 degrees of being tangent to a circle 96 centered at the central axis 28 and having a radius 98 equal to a predetermined distance.

With reference to FIG. 6, the nozzle 46 can optionally include a first lateral ramp 99 that can extend laterally between at least a portion of a span between the circumferentially extending shoulder 54 and the scavenge inlet aperture 66.

Returning to FIGS. 4 and 5, portions of the first housing member 30 are preferably (but not necessarily) formed in a mold (not shown) via casting (e.g., die casting) and include draft (i.e., are tapered) so as to facilitate the removal of the first housing member 30 from the mold. For example, the radially inner surface 60 of the working chamber channel 50 can be formed with draft such that the radially inner surface 60 of the working chamber channel 50 is shaped as a portion of a surface of a frustum. The magnitude of the draft on the radially inner surface 60 of the working chamber channel 50 can be set to a desired limit, such as less than or equal to five degrees, and more preferably less than or equal to three degrees. It will be appreciated that the magnitude of the draft need not be consistent on all features of the first housing member 30. For example, the portion 92 of the radially outer surface 90 of the nozzle 46 could be formed with draft and the magnitude of the draft on the radially outer surface 90 of the nozzle 46 can optionally be less than the magnitude of the draft on the radially inner surface 60 of the working chamber channel 50. In the example provided, the draft on the portion 92 of the radially outer surface 90 is less than or equal to 1.5 degrees. It will also be appreciated that one or more of the features of the first housing member 30 could be formed without draft, in which case the feature or features may require machining, such as turning or milling.

Figure 8:
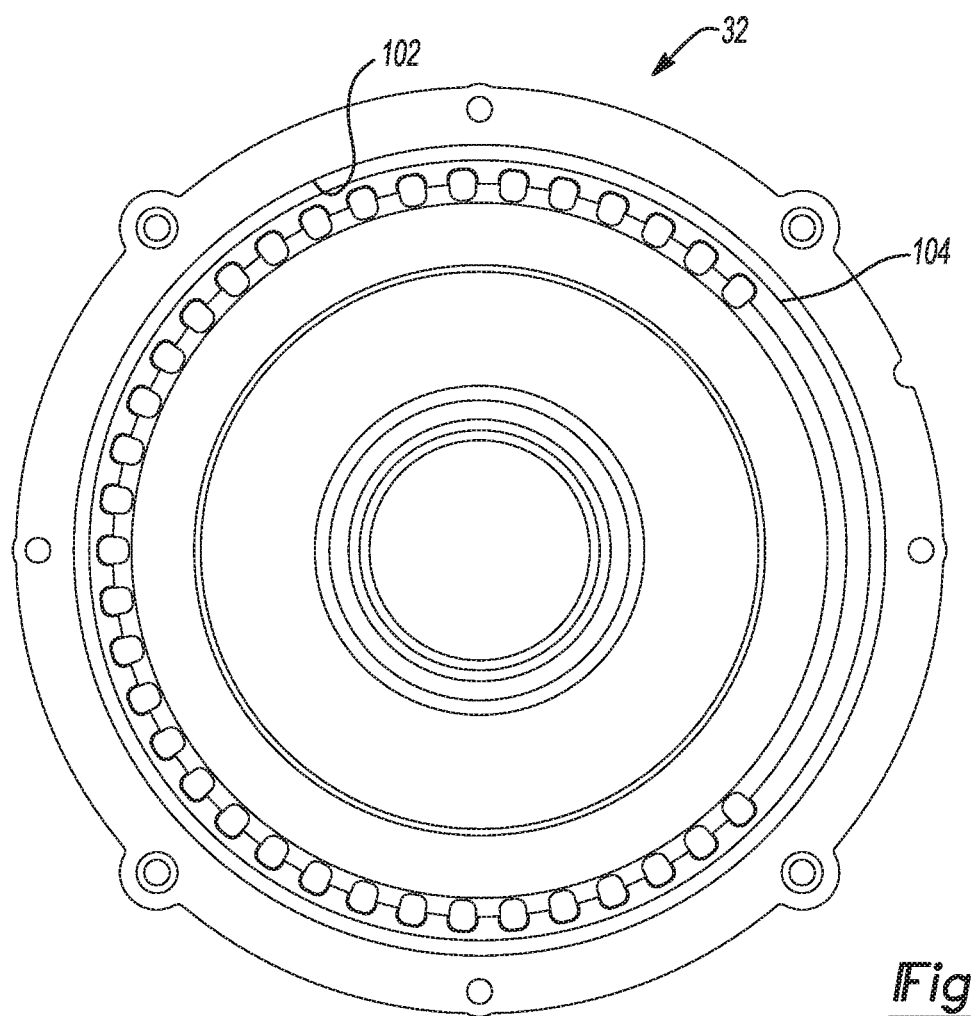
FIG. 8 is a front elevation view of a portion of the viscous fluid shear device of FIG. 1, illustrating a housing member of the housing assembly.

With reference to FIGS. 2 and 8, the second housing member 32 can have an abutment surface 100, a second rotor bore 102, and a working chamber groove 104. The abutment surface 100 can be disposed on a side of the second housing member 32 that faces the first housing member 30. Typically a gasket 106 can be disposed between the abutment surface 100 and a mating surface 108 on the first housing member 30 that can sealingly engage the abutment surface 100 and the mating surface 108. The abutment surface 100 can close an end of the scavenge inlet aperture 66 that is opposite the first conduit portion 68. The second rotor bore 102 and the working chamber groove 104 can be formed into the abutment surface 100. In the example provided, the second rotor bore 102 has a diameter that is equal to a diameter of the first rotor bore 52. It will be appreciated however, that the diameters of the first and second rotor bores 52 and 102 can be sized differently. It will also be appreciated that if the second housing member 32 is formed at least partly via casting, the second rotor bore 102 could be formed with draft so as to be frustoconical in shape. The working chamber groove 104 can have a root surface 110. Optionally, the nozzle 46 can include a second lateral ramp (not shown) that can be similar to the first lateral ramp 99 (FIG. 6) except that it can extend laterally between at least a portion of a span between the root surface 110 and the scavenge input aperture 66.

Returning to FIGS. 3 through 5, the wiper 18 can be coupled to the first housing member 30 proximate the scavenge inlet aperture 66. The wiper 18 can optionally be unitarily and integrally formed with the first circumferentially extending wall 42 of the first housing member 30 and can project radially inwardly of the radially inner surface 60 of the working chamber channel 50. A radially inner surface 130 of the wiper 18 can be defined by a radius 132 that extends from the central axis 28. In the example provided, a circle (not specifically shown) defined by the radius 132 of the radially inner surface 130 of the wiper 18 is intersected twice by a circle that is defined by the radius 80 of the scavenge inlet aperture 66. Stated another way, the circles that define the surface 76 of the scavenge inlet aperture 66 and the radially inner surface 130 of the wiper 18 intersect one another and are not tangent. The scavenge inlet aperture 66 can intersect the wiper 18 such that a first portion of the surface 76 of the scavenge inlet aperture 66 forms a leading end 138 of the wiper 18.

It will be appreciated that the wiper 18, the nozzle 46 and the scavenge conduit 44 can comprise a viscous fluid return system.

Returning to FIG. 2, the shaft 14 is disposed in the housing assembly 12 and is rotatable about the central axis 28. One or more sets of bearings 150 can be employed to support the housing assembly 12 on the shaft 14 to permit relative rotation between the housing assembly 12 and the shaft 14. A seal (not specifically shown) can be disposed between the shaft 14 and the housing assembly 12 to inhibit the egress of viscous fluid from the housing assembly 12. The shaft 14 can be rotatably coupled to a support (not shown) that can be fixedly coupled to a structure, such as an internal combustion engine (not shown). A pulley (not shown) can be coupled to the shaft 14 for rotation therewith. The pulley can receive rotary power from the internal combustion engine to drive the shaft 14 in a predetermined rotational direction.

The rotor 16 can be received in the housing assembly 12 and can be coupled to the shaft 14 for rotation therewith about the central axis 28 in a predetermined rotational direction. The rotor 16 can have a disk portion 160 that can have a plurality of second ribs 162, which are disposed concentrically about the central axis 28 and juxtaposed with the first ribs 36, and a circumferentially extending surface 166.

Figure 9:
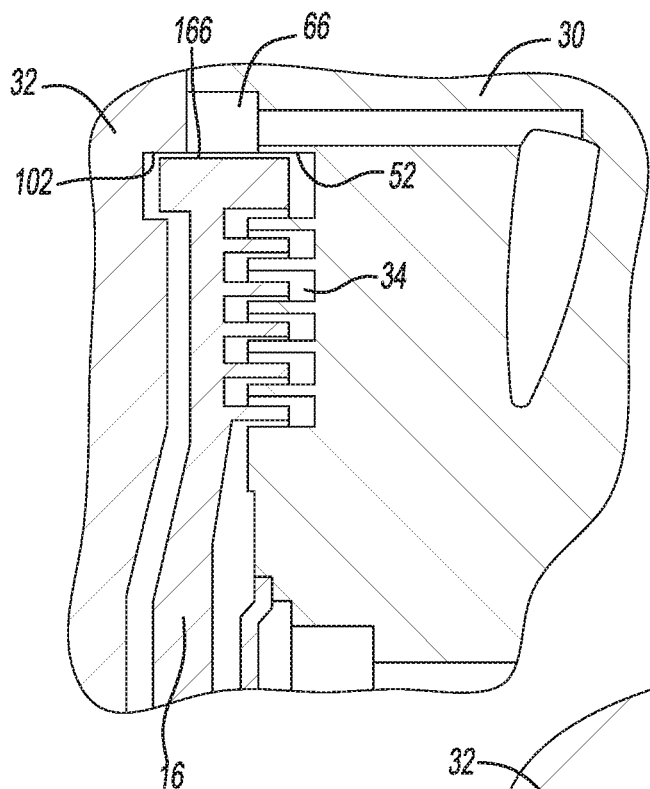
FIG. 9 is an enlarged portion of FIG. 2.
Figure 10:
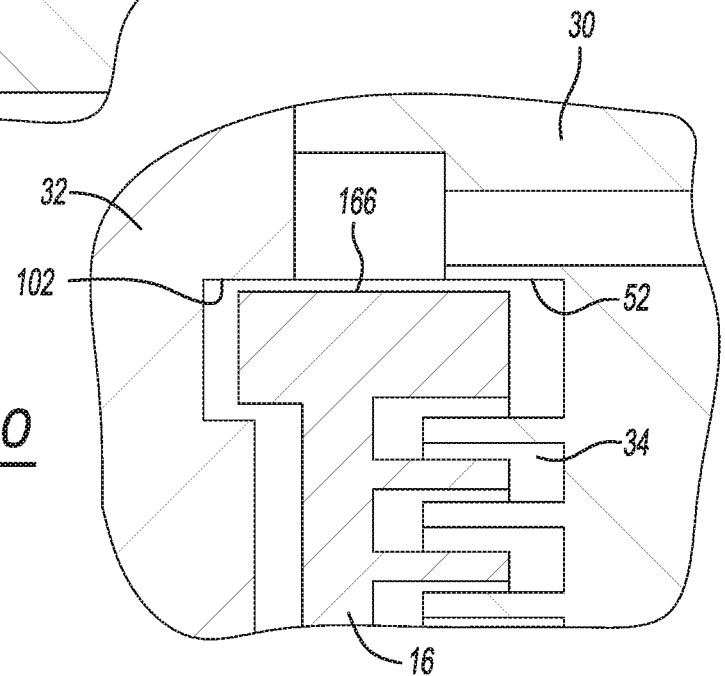
FIG. 10 is an enlarged portion of FIG. 9.

With reference to FIGS. 9 and 10, the circumferentially extending surface 166 can extend laterally into the first housing member 30 past the scavenge inlet aperture 66. Optionally, the circumferentially extending surface 166 of the rotor 16 can extend laterally into the first housing member 30 beyond the working chamber channel 50 (FIG. 5) and into the first rotor bore 52. If the second housing member 32 is configured with a second rotor bore 102, the circumferentially extending surface 166 of the rotor 16 can optionally extend laterally into the second housing member 32 into the second rotor bore 102. The first rotor bore 52 is larger in diameter than the diameter of the circumferentially extending surface 166 of the rotor 16. Preferably the diameter of the first rotor bore 52 is larger than the diameter of the circumferentially extending surface of the rotor 16 by an amount that is less than or equal to 1.5 mm and greater than or equal to 0.5 mm. More preferably, the diameter of the first rotor bore 52 is larger than the diameter of the circumferentially extending surface of the rotor 16 by an amount that is less than or equal to 0.8 mm and greater than or equal to 0.5 mm. If the second rotor bore 102 is formed in the second housing member 32, the second rotor bore 102 is larger in diameter than the diameter of the circumferentially extending surface 166 of the rotor 16. Preferably the diameter of the second rotor bore 102 is larger than the diameter of the circumferentially extending surface of the rotor 16 by an amount that is less than or equal to 1.5 mm and greater than or equal to 0.5 mm. More preferably, the diameter of the second rotor bore 102 is larger than the diameter of the circumferentially extending surface of the rotor 16 by an amount that is less than or equal to 0.8 mm and greater than or equal to 0.5 mm.

Returning to FIG. 2, the reservoir 20 can be disposed in the housing assembly 12 and can be in fluid communication with the scavenge conduit 44. In the particular example provided, the reservoir 20 is coupled to the housing assembly 12 (i.e., the first housing member 30) for rotation therewith and the second conduit portion 70 of the scavenge conduit 44 discharges viscous fluid directly into the reservoir 20. It will be appreciated, however, that the reservoir 20 could be coupled to the rotor 16 for rotation therewith.

The control valve 22 and the actuator 24 are conventional in their construction and operation and as such, need not be discussed in significant detail herein. Briefly, the control valve 22 is movable between a first position, which inhibits fluid flow from the reservoir 20 to the working chamber 34, and a second position that permits fluid flow from the reservoir 20 to the working chamber 34, and an actuator 24 is configured to selectively move the control valve 22 between its first and second positions. In the example provided, the actuator 24 comprises a bi-metal strip that is coiled about the central axis 28 and configured to provide a rotary input to the control valve 22, but it will be appreciated that the actuator 24 could be another type of actuator (e.g., electric or pneumatic-actuated) and/or could be configured to move the control valve 22 in a different way (e.g., axially).

Figure 11:
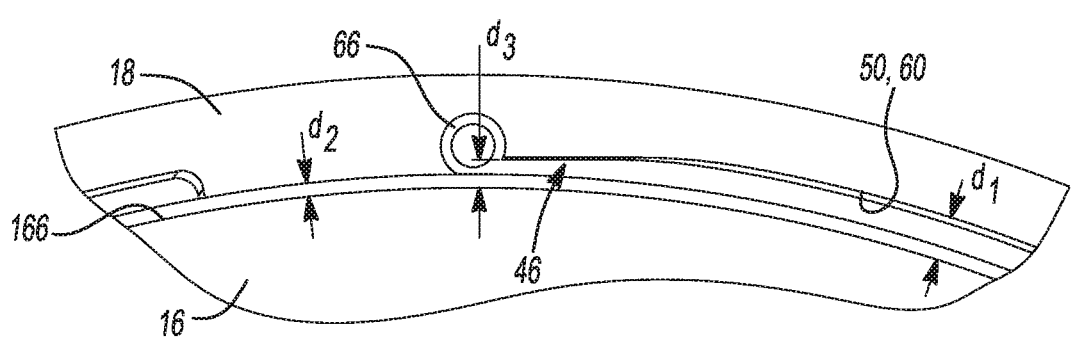
FIG. 11 is a portion of an elevation view illustrating the cover member and a rotor.

With reference to FIG. 11, a radially inner surface 60 of the working chamber channel 50 can be disposed from a circumferentially extending surface 166 of the rotor 16 by a first distance d1. At least one point on a radially inner surface 60 of the wiper 18 can be disposed from the circumferentially extending surface 166 of the rotor 16 by a second distance d2 that is smaller than the first distance d1. A point at which the nozzle 46 intersects the scavenge input aperture 66 is disposed a third distance d3 from the circumferentially extending surface of the rotor 16. The third distance d3 can be less than the first distance d1 and greater than the second distance d2.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A viscous fluid shear device comprising:
   a housing assembly that defines a working chamber having a plurality of first ribs, which are disposed concentrically about a central axis, the housing assembly comprising first and second housing members that are fixedly coupled to one another, the first housing member having a circumferentially extending wall and a viscous fluid return system, the circumferentially extending wall defining a working chamber channel having a radially inner surface, the viscous fluid return system having a wiper, a scavenge conduit and a nozzle, the wiper being unitarily and integrally formed with the circumferentially extending wall and projecting radially inwardly of the radially inner surface of the working chamber channel, the scavenge conduit having a scavenge inlet aperture, a first conduit portion and a second conduit portion, the scavenge inlet aperture being formed into the circumferentially extending wall and intersecting the wiper such that a first portion of a surface of the scavenge inlet aperture forms a leading end of the wiper, the scavenge inlet aperture being formed along a first longitudinal axis and having a first cross-sectional area taken perpendicular to the first longitudinal axis, the first conduit portion being formed in the circumferentially extending wall and intersecting the scavenge inlet aperture, the first conduit portion being formed along a second longitudinal axis, the second conduit portion intersecting the first conduit portion and extending radially inwardly therefrom, the nozzle extending circumferentially between the working chamber channel and scavenge inlet aperture, the nozzle being configured to discharge a viscous fluid directly into the scavenge inlet aperture;
   a rotor received in the housing assembly and being rotatable about the central axis relative to the housing assembly in a first predetermined rotational direction, the rotor having a disk portion having a plurality of second ribs that are disposed concentrically about the central axis and juxtaposed with the first ribs; and
   a reservoir disposed in the housing assembly and being in fluid communication with the scavenge conduit;
   wherein the radially inner surface of the working chamber channel is disposed from a circumferentially extending surface of the rotor by a first distance, wherein at least one point on a radially inner surface of the wiper is disposed from the circumferentially extending surface of the rotor by a second distance that is smaller than the first distance and wherein a point at which the nozzle intersects the scavenge input aperture is disposed a third distance from the circumferentially extending surface of the rotor, the third distance being less than the first distance and greater than the second distance.

2. The viscous fluid shear device of claim 1, wherein the nozzle comprises a radially outer surface, and wherein at least a portion of the radially outer surface of the nozzle has a flat, planar shape.

3. The viscous fluid shear device of claim 2, wherein the portion of the radially outer surface of the nozzle having the flat, planar shape is disposed in a plane, wherein the plane is spaced from the central axis by a predetermined distance, and wherein the plane is sloped such that it is within +10 degrees to −5 degrees of being tangent to a circle centered at the central axis, the circle having a radius equal to the predetermined distance.

4. The viscous shear device of claim 1, wherein the radially inner surface of the working chamber channel is formed with draft such that the radially inner surface of the working chamber channel is shaped as a portion of a surface of a frustum.

5. The viscous shear device of claim 4, wherein a magnitude of the draft on the radially inner surface of the working chamber channel is less than or equal to 5 degrees.

6. The viscous shear device of claim 5, wherein the magnitude of the draft on the radially inner surface of the working chamber channel is less than or equal to 3 degrees.

7. The viscous shear device of claim 4, wherein the nozzle comprises a radially outer surface, and wherein at least a portion of the radially outer surface of the nozzle is formed with draft.

8. The viscous shear device of claim 7, wherein a magnitude of the draft on the radially outer surface of the nozzle is less than a magnitude of the draft on the radially inner surface of the working chamber channel.

9. The viscous shear device of claim 7, wherein the magnitude of the draft on the radially outer surface of the nozzle is less than or equal to 1.5 degrees.

10. The viscous shear device of claim 1, wherein the surface of the scavenge inlet aperture is defined by a radius that extends perpendicular from the first longitudinal axis of the scavenge inlet aperture.

11. The viscous shear device of claim 10, wherein the radially inner surface of the wiper is defined by a radius that extends from the central axis, wherein a first circle defined by the radius of the radially inner surface of the wiper is intersected twice by a second circle that is defined by the radius of the surface of the scavenge inlet aperture.

12. The viscous shear device of claim 10, wherein the radius is less than or equal to 1.5 mm.

13. The viscous shear device of claim 1, wherein the first and second longitudinal axes are coincident.

14. The viscous shear device of claim 1, wherein the reservoir is coupled to the housing assembly for rotation therewith.

15. The viscous shear device of claim 1, wherein the circumferentially extending surface of the rotor extends laterally into the first housing member past the scavenge inlet aperture.

16. The viscous shear device of claim 1, wherein the working chamber channel terminates at a circumferentially extending shoulder, and wherein the nozzle comprises a first lateral ramp that extends laterally between at least a portion of a span between the circumferentially extending shoulder and the scavenge inlet aperture.

17. The viscous shear device of claim 16, wherein the first housing member further defines a first rotor bore that is formed in the circumferentially extending wall, the first rotor bore being smaller in diameter than the working chamber channel, the first rotor bore extending laterally into the first housing member, the circumferentially extending surface of the rotor extending laterally beyond the working cavity into the first rotor bore.

18. The viscous shear device of claim 17, wherein the first rotor bore is larger in diameter than the circumferentially extending surface of the rotor by an amount that is less than or equal to 1.5 mm and greater than or equal to 0.5 mm.

19. The viscous shear device of claim 18, wherein the amount is less than or equal to 0.8 mm.

20. The viscous shear device of claim 17, wherein the second housing member defines a second rotor bore, wherein the circumferentially extending surface of the rotor extends laterally into the second rotor bore.

21. The viscous shear device of claim 20, wherein the second housing member defines a working chamber groove that is formed into an abutment surface of the second housing member that faces the first housing member, the working chamber groove having a root surface, and wherein the nozzle comprises a second lateral ramp that extends laterally between at least a portion of a span between the root surface and the scavenge input aperture.

22. The viscous shear device of claim 21, wherein the abutment surface closes an end of the scavenge input aperture that is opposite the first conduit portion.

23. The viscous shear device of claim 20, wherein the second rotor bore has a diameter that is equal to a diameter of the first rotor bore.

24. The viscous shear device of claim 1, wherein at least a portion of the first conduit portion has a second cross-sectional area taken perpendicular to the second longitudinal axis that is smaller than the first cross-sectional area.

* * * * *